United States Patent
Jochem et al.

(10) Patent No.: US 8,019,513 B2
(45) Date of Patent: Sep. 13, 2011

(54) VISION GUIDANCE SYSTEM AND METHOD FOR IDENTIFYING THE POSITION OF CROP ROWS IN A FIELD

(75) Inventors: Todd Jochem, Wexford, PA (US); Parag Batavia, Wexford, PA (US); Mark Ollis, Cranberry Township, PA (US)

(73) Assignee: Applied Perception Inc., Wexford, PA (US)

(*) Notice: Subject to any disclaimer, the term of this patent is extended or adjusted under 35 U.S.C. 154(b) by 1236 days.

(21) Appl. No.: 11/678,558

(22) Filed: Feb. 23, 2007

(65) Prior Publication Data

US 2007/0271013 A1 Nov. 22, 2007

Related U.S. Application Data

(60) Provisional application No. 60/801,456, filed on May 18, 2006.

(51) Int. Cl.
*G06F 19/00* (2011.01)
(52) U.S. Cl. ............... 701/50; 701/28; 701/41; 701/300; 348/104; 348/120; 382/104; 382/154
(58) Field of Classification Search .................... 701/41, 701/50, 300; 348/120; 382/104
See application file for complete search history.

(56) References Cited

U.S. PATENT DOCUMENTS

| | | |
|---|---|---|
| 5,675,489 A | 10/1997 | Pomerleau |
| 5,983,161 A | 11/1999 | Lemelson et al. |
| 6,275,773 B1 | 8/2001 | Lemelson et al. |
| 6,278,918 B1 | 8/2001 | Dickson et al. |
| 6,385,515 B1 * | 5/2002 | Dickson et al. ................. 701/28 |
| 6,445,983 B1 | 9/2002 | Dickson et al. |
| 6,487,500 B2 | 11/2002 | Lemelson et al. |
| 6,490,539 B1 * | 12/2002 | Dickson et al. ............... 702/150 |

(Continued)

FOREIGN PATENT DOCUMENTS

WO 96/17279 6/1996

(Continued)

OTHER PUBLICATIONS

Reid, J.F.; and Searcy, S.W. An Algorithm for Computer Vision Sensing of a Row Crop Guidance Directrix, International Off-Highway & Powerplant Congress and Exposition, 1991, pp. 1-13.

(Continued)

*Primary Examiner* — Khoi Tran
*Assistant Examiner* — Jonathan L Sample
(74) *Attorney, Agent, or Firm* — AlbertDhand LLP

(57) ABSTRACT

A system and method of identifying a position of a crop row in a field, where an image of two or more crop rows is transmitted to a vision data processor. A preferential scan line profile in a search space about a candidate scan line profile is determined, and the candidate scan line profile is identified as a preferential scan line profile for estimating a position (e.g., peak variation) of one or more crop rows if a variation in the intensity level of the candidate scan line profile exceeds a threshold variation value. Alternatively, a position datum associated with a highest intensity value within the array of vector quantities can be selected as being indicative of a candidate position of a crop row. The candidate position is then identified as a preliminary row position if a variation in intensity level of the candidate scan line profile exceeds a threshold variation value.

26 Claims, 12 Drawing Sheets

U.S. PATENT DOCUMENTS

| | | | |
|---|---|---|---|
| 6,728,608 B2 | 4/2004 | Ollis et al. | |
| 2004/0039498 A1 | 2/2004 | Ollis et al. | |
| 2004/0264761 A1* | 12/2004 | Mas et al. ............... | 382/154 |
| 2004/0264763 A1* | 12/2004 | Mas et al. ............... | 382/154 |
| 2005/0088642 A1 | 4/2005 | Singh et al. | |
| 2006/0095207 A1* | 5/2006 | Reid ....................... | 701/301 |
| 2007/0001096 A1* | 1/2007 | Wei et al. ............... | 250/208.1 |
| 2007/0001097 A1* | 1/2007 | Wei et al. ............... | 250/208.1 |
| 2007/0003107 A1* | 1/2007 | Wei et al. ............... | 382/104 |
| 2007/0005208 A1 | 1/2007 | Han et al. | |
| 2007/0014434 A1* | 1/2007 | Wei et al. ............... | 382/104 |

FOREIGN PATENT DOCUMENTS

WO            03/098260            11/2003

OTHER PUBLICATIONS

Pomerleau, D. Ralph: Rapidly Adapting Lateral Position Handler, IEEE Symposium on Intelligent Vehicle, Detroit, MI [online], 1995 [retrieved Nov. 18, 2005]. Retrieved from the Internet: <URL: www.cs.cmu.edu/~tjochem/nhaa/ralph.html>.

Jahns, G. Navigating of Agricultural Field Machinery, Computers and Electronics in Agriculture, 1999, pp. 1-2.

Reid, J.F.; Zhang, Q.; Noguchi, N.; Dickson, M. Agricultural Automatic Guidance Research in North America, Computers and Electronics in Agriculture, 2000, pp. 155-167.

Rovira-Mas, F.; Han, S.; Wei, J.; Reid, J.F. Fuzzy Logic Model for Sensor Fusion of Machine Vision and GPS in Autonomous Navigation, 2005, ASAE Annual International Meeting, Tampa, FL, USA. ASAE Paper No. 051156.

Ollis, M.; Stentz, A. Vision-Based Perception for an Automated Harvester. Robotics Institute, Carnegie Mellon University, 1996.

Zhang, F.M.; Ying, Y.B.; Zhang, Q. A Robust Approach to Obtain a Crop Edge Based on Wavelet Filter ad Fuzzy Recognition. Automation Technology for Off-Road Equipment, Proceedings of the Oct. 7-8, 2004 Conference, ASAE Publication No. 701P1004, 2004, pp. 36-46.

Rovira-Mas, F.; Zhang, Q.; Reid, J.F.; Will, J.D. Machine Vision Row Crop Detection Using Blob Analysis and the Hough Transform. Automation Technology for Off-Road Equipment, Proceedings of the Jul. 26-27, 2002 Conference, ASAE Publication No. 701P0502.

Tsai, R. An Efficient and Accurate Camera Calibration Technique for 3D Machine Vision. IBM, T.J. Watson Research Center, 1986, pp. 364-373.

Pinto, F.A.C.; Reid, J.F. Heading Angle and Offset Determination Using Principle Component Analysis. 1998. ASAE Paper No. 983113.

Ollis, M.; Stentz, A. First Results in Vision-Based Crop Line Tracking. Robotics Institute, Carnegie Mellon University, 1997.

Zhang, Q.; Reid, J.F.; Noguchi, N. Agricultural Vehicle Navigation Using Multiple Guidance Sensors, 1999.

Taylor, S. Intel Integrated Performance Primitives, How to Optimize Software Applications Using Intel IPP. Intel Press, 2004, pp. 207-293.

Marchant, J.A. Tracking of Row Structure in Three Crops Using Image Analysis, Computers and Electronics in Agriculture, 1996, pp. 161-170.

Astrand, B.; Baerveldt, A. A Vision Based Row-Following System for Agricultural Field Machinery, Mechatronics, 2005, pp. 251-269.

Han, S.; Zhang, Q.; Ni, B.; Reid, J.F. A Guidance Directrix Approach to Vision-Based Vehicle Guidance Systems, Computers and Electronics in Agriculture, 2004, pp. 179-195.

Wei, J.; Han, S.; Rovira-Mas, F.; Reid, J.F. A Method to Obtain Vehicle Guidance Parameters from Crop Row Images, 2005, ASAE Annual International Meeting, Tampa, FL, USA. ASAE Paper No. 051155.

Okamoto, H.; Hamada, K.; Kataoka, T.; Terawaki, M.; Hata, S. Automatic Guidance System with Crop Row Sensor. Automation Technology for Off-Road Equipment, Proceedings of the Jul. 26-27 Conference. ASAE Publication No. 701P0502. 2002.

Southall, B.; Marchant, J.A.; Hague, T.; Buxton, B.F. Model Based Tracking for Navigation and Segmentation. Silsoe Research Institute, 1998.

* cited by examiner

US 8,019,513 B2

VISION GUIDANCE SYSTEM AND METHOD FOR IDENTIFYING THE POSITION OF CROP ROWS IN A FIELD

CROSS-REFERENCE TO RELATED PATENT APPLICATIONS

This application claims priority from U.S. Provisional Application 60/801,456, filed May 18, 2006, incorporated herein by reference in its entirety.

FIELD OF THE INVENTION

The present invention relates generally to guidance systems. In particular, the present invention relates to vision guidance systems for identifying the position of crop rows in a field with respect to a vehicle.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Vision systems may use one or more imaging units such as cameras to collect image data of an agricultural field or similar geographical area. The image data may be utilized to facilitate the identification of multiple crop rows in the agricultural field. Information resulting from the identification of the multiple crop rows can then be used to aid in guiding a vehicle through or about the multiple crop rows.

To be useful for practical applications, such as the guidance of a vehicle with reference to the identified multiple crop rows, a data processor is generally required to have adequate throughput or processing capacity to provide a sufficiently rapid or real-time assessment of the collected image data. For example, the techniques generally require extensive pre-processing algorithms such as binarization processes and threshold calculations in order to accurately identify crop rows from images taken of an agricultural field scene. In addition, the principal pattern recognition methods used with conventional crop row detection techniques are highly sensitive to noise picked up in the field scene images.

Accordingly, a technique is desirable for efficiently determining the position of crop rows in a field by reducing or minimizing the processing burden on the data processor, as well as compensating for image aberrations is desirable.

SUMMARY OF THE INVENTION

Various embodiments of the present invention provide a system and method of identifying a position of a crop row in a field. An imaging unit is used for collecting image data of a field having two or more crop rows in a scene. A definer defines a candidate scan line profile for a corresponding heading and pitch of an imaging unit. The candidate scan line profile comprises an array of vector quantities, where each vector quantity comprises an intensity value and a corresponding position datum. A search engine searches for a preferential scan line profile in a search space about the candidate scan line profile. The search space is defined with reference to a corresponding pitch and heading of the imaging unit or a vehicle traversing the field. A confidence module or the search engine identifies the candidate scan line profile as a preferential scan line profile for estimating a position (e.g., peak variation) of one or more crop rows if a variation in the intensity level of the candidate scan line profile exceeds a threshold variation value. Alternatively, a position datum associated with a highest intensity value within the array of vector quantities can be selected as being indicative of a candidate position of a crop row. The candidate position is then identified as a preliminary row position if a variation in intensity level of the candidate scan line profile exceeds a threshold variation value.

This system and method of identifying a position of a crop row allows for reduced processing burden and/or increased responsiveness by constraining the search space for a preferential heading of the vehicle. In addition, normalization techniques are utilized to add robustness to the system and method while reducing the certain negative effects of inconsistent lighting and image data collection.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Figure 1:
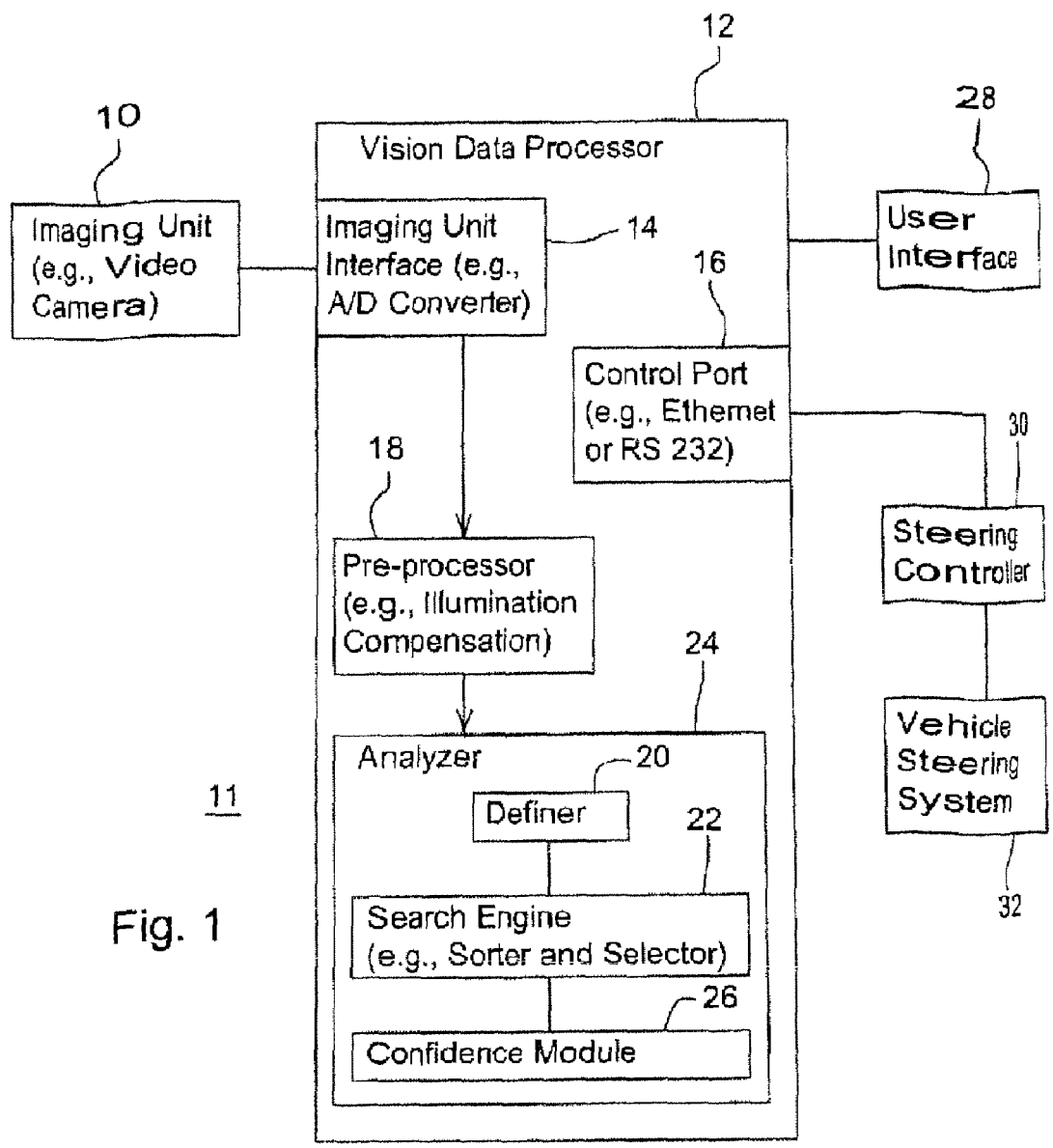
FIG. 1 is a block diagram of a vision guidance system for identifying a position of a crop row in a field.

In accordance with one embodiment of the present invention, FIG. 1 illustrates a vision guidance system 11 for determining the position of rows with respect to a vehicle. The examples discussed hereafter relate to crop rows in an agricultural field. The vehicle may comprise a tractor, a combine, a harvester, a sprayer, an agricultural vehicle, or any other type of vehicle or entity requiring guidance. An imaging unit 10 (e.g., a video camera) can be directly or indirectly coupled to a vision data processor 12, where the imaging unit 10 can be mounted on a vehicle. Alternatively, the imaging unit 10 can be integrated into or with the vision data processor 12 if desired. The vision data processor 12 may comprise an imaging unit interface 14 (e.g., an analog to digital converter), a pre-processor 18, a control port 16 (e.g., Ethernet, RS 232, etc.), an analyzer 24, and at least one memory unit (not shown). The vision data processor 12 may also be associated with a user interface 28. For example, the user interface 28 may comprise one or more of, but is not limited to, a display (e.g., a liquid crystal display), a monitor, a keypad, a keyboard, a pointing device (e.g., an electronic mouse), and another suitable input/output device for a user with which to interact with the vision data processor 12. In a manual steering mode of the vehicle, a display of the user interface 28 may display guidance information to an operator of the vehicle to assist the operator in aligning the vehicle with one or more crop rows. The manual steering mode indicates that an operator steers the vehicle him/herself (e.g., via turning a steering wheel) in accordance with visual guidance data output provided to the user interface 28.

The control port 16 of the vision data processor 12 may comprise a data port that is capable of providing an output of the vision data processor 12 to a steering controller 30. This is useful, for example, when an automatic steering mode is utilized for driving the vehicle, where the steering controller 30 is coupled to a vehicle steering system 32. In the automatic steering mode, the control port 16 outputs guidance information (e.g., heading, angle data) to the steering controller 30, and the steering controller 30 generates an output for actuating the vehicle steering system 32 based on the guidance information. The vehicle steering system 32 may comprise, but is not limited to, a servo-motor, an electric motor, a step-motor, an electro-mechanical device, a hydraulic steering controller, or an electro-hydraulic device for steering one or more wheels or moving components of the vehicle.

The automatic steering mode refers to a mode in which the operator does not generally steer the vehicle (e.g., via turning a steering wheel, as described above in relation to the manual steering mode). The automatic steering mode may be referred to as an auto-steer mode, an autonomous mode, a vision-guidance mode, an unmanned mode, or some otherwise automated mode. The automatic steering mode is distinct from the manual steering in that with the automatic steering mode, the vision guidance system 11 controls the heading or position of the vehicle with respect to the one or more crop rows.

In the one embodiment of the present invention, the pre-processor 18 comprises an illumination compensator. The illumination compensator compensates for variations within an image or variations between images resulting from ambient lighting conditions. The pre-processor 18 may process the images received from the imaging unit 10 prior to subsequent processing or analysis, as discussed further below.

The analyzer 24 may comprise one or more of the following: a definer 20, a search engine 22, and a confidence module 26. The definer 20 defines a candidate scan line profile for a corresponding heading and pitch of the imaging unit 10 or the vehicle. A search engine 22 searches candidate scan line profiles for a preferential scan line profile in a search space about the candidate scan line profile. A confidence module 26 may comprise a device for determining the reliability of the preferential scan line profile.

The imaging unit 10 may communicate with the imaging unit interface 14. In one embodiment of the present invention, if the imaging unit 10 provides an analog output, the imaging unit interface 14 comprises an analog-to-digital (A/D) converter as described above. In another embodiment of the present invention, if the video imaging unit 10 provides a digital output, the video imaging unit interface 14 comprises an input/output port associated with a buffer memory or other data storage for storing one or more images inputted to the input/output port by the video imaging unit 10. The size of the buffer memory may be inversely proportional to the processing capacity or throughput of the vision data processor 12. The vision data processor 12 may reduce its processing burden and/or increase its responsiveness by constraining the search space for a preferential heading of the vehicle, if the confidence level exceeds a threshold minimum confidence level. For example, the search engine may search for a preferential heading in incremental steps (e.g., steps of approximately one degree). Likewise the search engine may search for a preferential pitch in incremental steps (e.g., steps of approximately 0.1 degree). In one scenario, the imaging unit 10 collects image data at a minimum frame rate of about 30 Hz or 1 frame per ⅟30 of a second. The vision data processor 12 processes the collected image data to output tracking data (e.g., preferential heading and pitch) at a corresponding minimum rate of about 30 Hz to 60 Hz. It should be noted that virtually any minimum frame rate or output tracking rate may fall within the scope of the various embodiments of the present invention.

Figure 2:
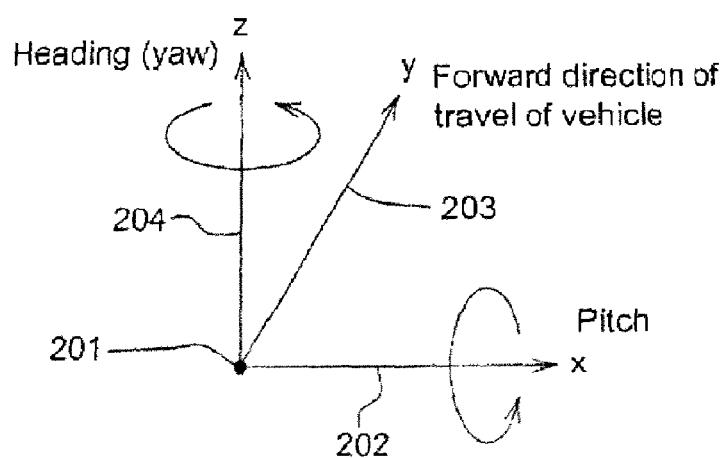
FIG. 2 is a diagram of a coordinate system associated with an imaging unit.

FIG. 2 shows a coordinate system associated with the imaging unit 10. In one embodiment of the present invention, the imaging unit 10 is associated with, or referenced to, an origin 201 of an X-axis 202, a Y-axis 203, and a Z-axis 204. The Y-axis 203 is associated with a forward direction of travel of the vehicle. The X-axis 202 is associated with a pitch of the vehicle, as illustrated by the curved arrow about the X-axis 202. The Z-axis 204 is associated with the heading or yaw of the vehicle, as illustrated by the curved arrow about the Z-axis 204. The heading or yaw may be defined as an angle with respect to the forward direction of travel or Y-axis. Heading and yaw are generally considered to be synonymous, and hereinafter may be used interchangeably. The heading and pitch may be defined as angles, vectors, or other appropriate parameters.

Figure 3A:
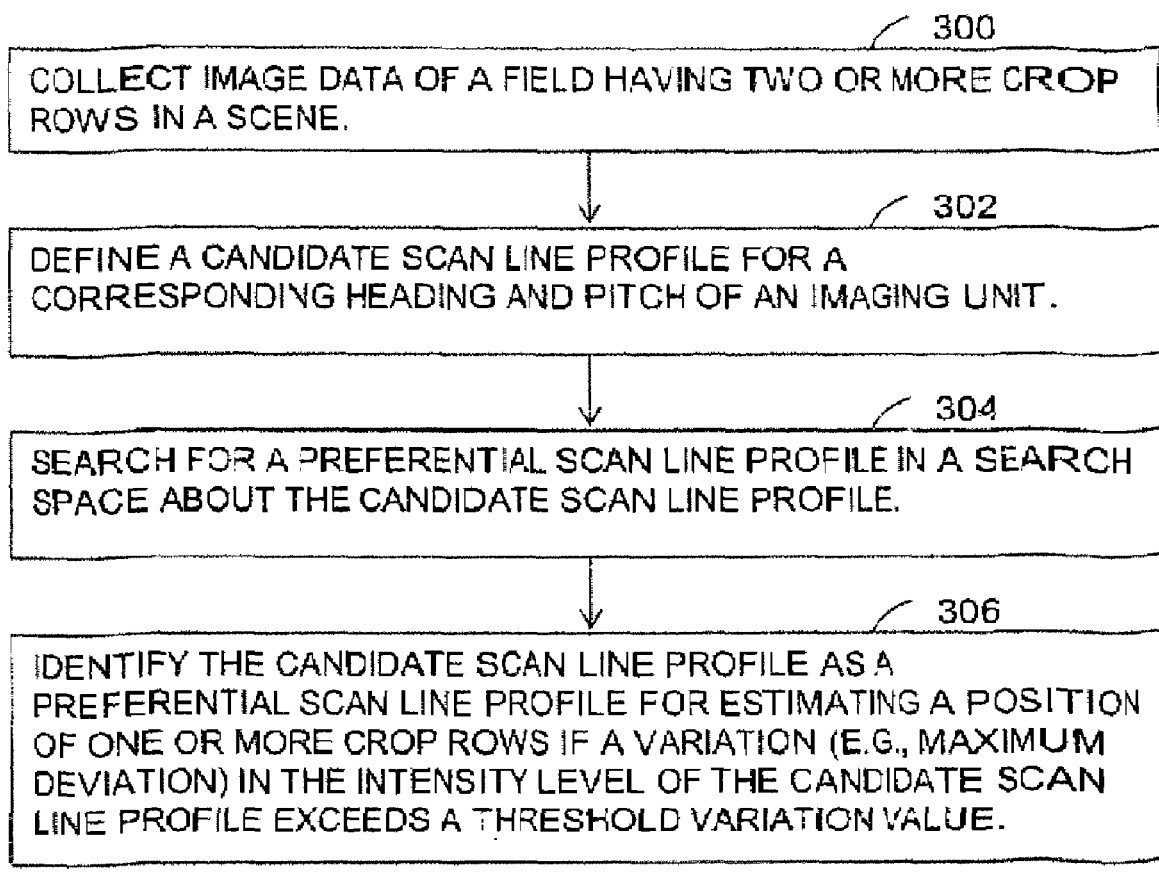
FIG. 3A is a flow chart of one embodiment of a method for identifying a position of a crop row in a field.

FIG. 3A shows a flow chart describing a method of identifying a position of a crop row in a field. At 300, the imaging unit 10 or the guidance system 11 collects image data of an agricultural field having two or more crop rows in a scene. For example, the imaging unit 10 may collect video image data as the image data at a frame rate of at least about 30 Hz or 1 frame per ⅟30 second as discussed above. It should be noted that maintaining a high cycle rate is desirable because cycle rate correlates positively with estimated smoothness and low noise. The core algorithm utilized in operating the various embodiments of the present invention runs at this frame rate, even with a relatively expensive gradient normalization operation (discussed below). Therefore, the various embodiments of the present invention are able to output estimates of offset, yaw, and pitch at about 30 Hz, which is more than adequate for smooth tracking.

The high cycle rate is also desirable in that the dynamic constraints used to constrain the offset/yaw/pitch search between frames are more easily applied by assuming that a lateral offset jump of, for example, about 20 cm is impossible in 1/30th of a second. The actual frame rate depends on the pitch and yaw range over which a search is performed, along with the spacing of the scan lines. When the core algorithm is tracking property, a search is constrained to +/−1 degree of heading and pitch, in 0.1 degree steps as described above although this range can be expanded when confidence (discussed below) drops, in an attempt to reacquire tracking. When operating in the nominal tracking mode, though, the actual frame rates are about 70 Hz when image normalization is off, and about 40 Hz when image normalization is on. Therefore, with image normalization off, tracking is possible at the video field rate, i.e., about 60 Hz, although image normalization can be valuable and, under at least certain circumstances, worth leaving on.

At 302, the analyzer 24 or the definer 20 defines a candidate scan line profile for a corresponding heading and pitch of the imaging unit 10. The candidate scan line profile comprises an array of vector quantities, where each vector quantity comprises an intensity value and a corresponding position datum. The position datum may be referenced to an X-axis as shown in FIG. 4B, where the X-axis is perpendicular, relative to the length of a crop row/forward direction of travel of the vehicle (i.e., the X-axis 202). The intensity value comprises a mean intensity value associated with a scan line segment within the collected image data.

In carrying out the process at 302, the candidate scan line profile may cover a transverse range of interest or field of view along the X-axis 202 relative to the imaging unit 10. The field of view along the X-axis 202 may vary with the optical lens and aperture (or other settings) of the imaging unit 10. The transverse range may cover one or more crop rows, which may vary with the crop row spacing used during the planting of the crops, or any precursor thereof (e.g., seeds, saplings, or plants).

At 304, the analyzer 24 or the search engine 22 searches for a preferential scan line profile in a search space about the candidate scan line profile. The search space is defined by the corresponding pitch and heading of the imaging unit 10. It is understood that a candidate scan line profile varies as it is rotated about the origin 201, in heading angle (yaw angle) or pitch angle, for example.

At 306, the analyzer 24 or the search engine 22 identifies the candidate scan line profile as a preferential scan line profile for estimating a position of one or more crop rows if a variation in the intensity level of the candidate scan line profile exceeds a threshold variation value. It should be noted that the identification of the preferential candidate scan line profile does not necessarily identify the position of the crop rows. Instead, the preferential scan line profile can be interpreted or processed, where the preferential scan line profile simply represents a generally reliable starting point for such processing and interpretation. The identifying process at 306 may be carried out by several techniques that may be applied individually or cumulatively. Utilizing a first technique, the candidate scan line profile is identified as a preferential scan line profile if the variation in the levels between a minimum intensity level and a maximum intensity level (e.g., peak-to-trough difference) exceeds a threshold variation value. Utilizing a second technique, the identifying process comprises determining a sum of the absolute differences (SAD) for the candidate scan line profile and identifying the candidate scan line profile as a preferential scan line profile if the SAD exceeds a threshold value. The second technique may be executed by first defining a reference intensity value, which may comprise an average intensity value, a median intensity value, an average of mean scan line intensities, or another reference value. The SAD is then determined with reference to an absolute value (e.g., absolute error value) between the reference intensity value and an actual mean intensity value of any scan line.

Figure 3B:
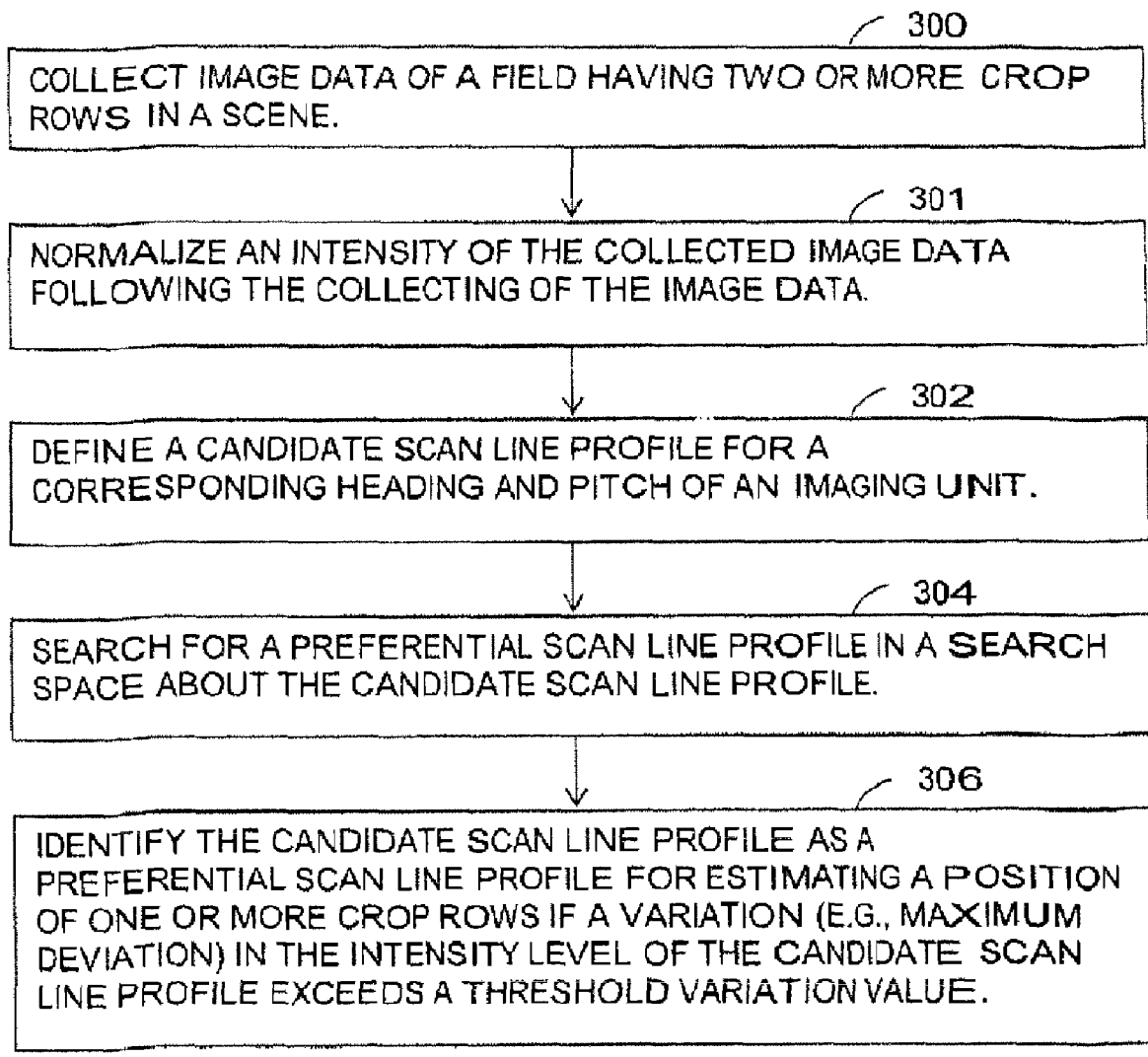
FIG. 3B is a flow chart of another embodiment of a method for identifying a position of a crop row in a field.

FIG. 3B shows a similar flow chart to the flow chart shown in FIG. 3A, except that FIG. 3B further comprises an additional process 301 after process 300. Like reference numbers in FIGS. 3A and 3B indicate like processes. At 301, the pre-processor 18 normalizes an intensity of the collected image data following the collecting of the image data. For example, the pre-processor 18 defines a virtual, generally horizontal plane in the collected image data, and subtracts out the virtual, generally horizontal plane to reduce the image intensity variation throughout the collected image data. Intensity can indicate an illumination value, brightness value, or luminance value of one or more pixels comprising the image data.

In particular, pre-processing can be performed on images before doing a hypothesis search (described in detail below). The reasons for performing pre-processing comprise being able to add robustness to uneven lighting (e.g., low sun angle resulting in higher lighting levels for one side of a crop row) and to rectify an observed "jittering" in the auto-gain/auto-exposure of cameras being used for data collection. The jittering occurs at extremely high frequency (frame-by-frame), and in the worst cases, causes noise in the estimated pitch, heading, and offset. To alleviate these issues, pre-processing is performed which normalizes the intensity as described above. Therefore, pre-processing has at least two positive effects: 1) much less inter-image intensity variation, making estimation smoother and more robust; and 2) since the intensity is normalized to a known value the confidence metric (described in more detail below), which is based on mean intensity values, is now much more consistent across multiple crop types and lighting conditions. This translates into an ability to set a threshold for low confidence which works well. In conventional systems, a low confidence value in one video sequence with bright lighting would be the same as the high confidence value in another sequence with poor lighting. This is not the case when performing pre-processing.

Figure 4A:
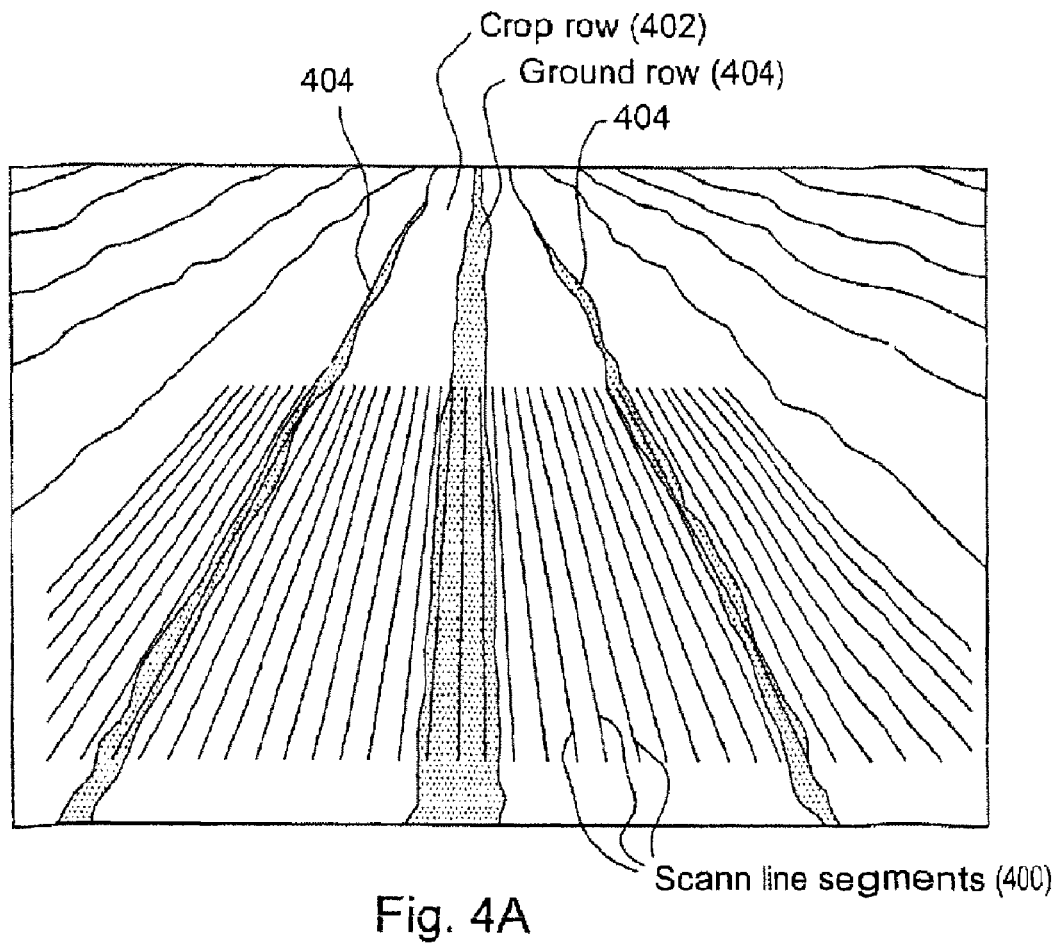
FIG. 4A is an illustration of a first alignment of scan line segments to crop rows.
Figure 4B:
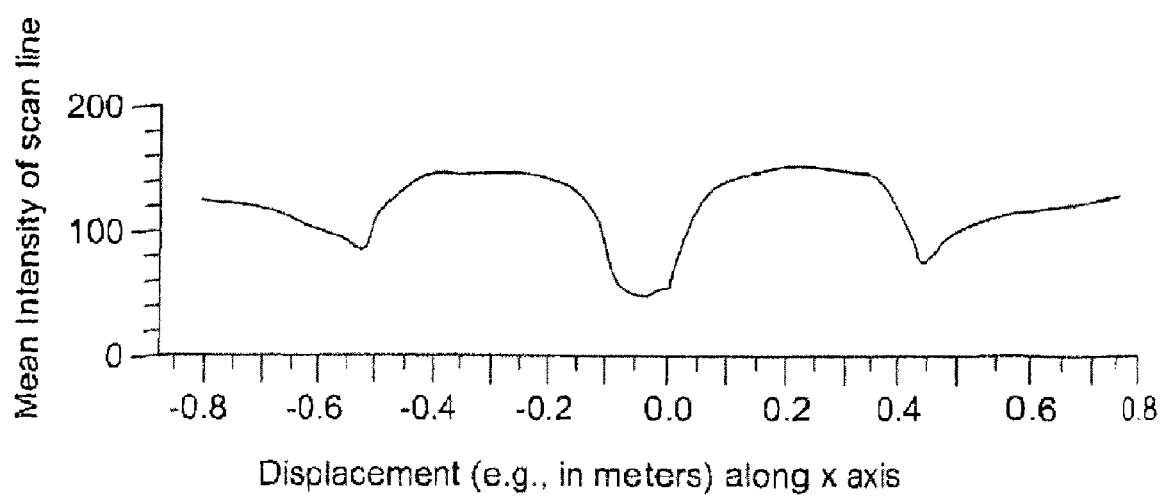
FIG. 4B is a first scan line profile associated with the first alignment of scan line segments to crop rows in FIG. 4A.

FIG. 4A illustrates a first alignment of scan line segments 400 to crop rows 402. As shown, each crop row 402 is separated from an adjacent crop row 402 by a ground row 404, which represents areas of soil, bare ground, mulched ground, weeds or other areas where no crop actually exists. The ground row 404 may also be referred to as an intervening row or intervening space. The scan line segments 400 are aligned with the crop rows 402 (or an interface between the crop row 402 and an adjoining ground row 404) to provide a generally reliable preferential heading (e.g., preferential yaw angle). The image data of FIG. 4A represents input data to the vision data processor 12 and the scan line profile of FIG. 4B represents illustrative data associated with the analyzer 24 or the confidence module 26. For example, the confidence module 26 can evaluate the first alignment of scan line segments 400 to crop rows 402 (of FIG. 4A) to have a confidence score exceeding a minimum threshold confidence score (in FIG. 4B). FIGS. 4A and 4B represent a heading/pitch hypothesis for a candidate heading, such that the candidate heading achieves the status of a preferential heading.

In FIG. 4B, the first scan line profile is associated with a first alignment of scan line segments 400 to crop rows 402 in FIG. 4A, where the image in FIG. 4A shows the scan line segments 400, which are hypothesized, superimposed over the crop rows 402 to illustrate pitch and yaw. The image of FIG. 4A represents the input data to the vision data processor 12. The first scan line profile appears on a chart shown in FIG. 4B in which the vertical axis represents mean scan line intensity of the pixels, for example, within a corresponding scan line. The horizontal axis represents relative distance along the X-axis 202 as described in FIG. 2. FIG. 4B is a one-dimensional mean intensity vector used by the confidence module 26 or the vision data processor 12 to determine a reliability level or confidence level. Each point in the vector is the mean pixel intensity along the corresponding scan line.

Furthermore, in FIG. 4B the peak intensity of the first scan line profile generally corresponds to a center of a crop row 402, whereas the minimum intensity generally corresponds to a ground row 404 (e.g., an intervening row or exposed soil, mulch as described above) between the crop rows 402. In one scenario, the confidence module 26 considers the variation in intensity between a center of a crop row and ground row 404 (e.g., intervening row).

In particular, an algorithm is used to compute the location of the crop centers as follows: 1) A sorted version of the scan line vector by intensity is created. The sorted array is maintained as an array of <intensity, X-value> pairs; 2) The first item in this array is taken and is assumed to be a crop row (since it has the highest intensity); 3) All items in the array which are within 10 cm of the assumed center are then found, and a weighted X-centroid of these elements is computed, thus refining the position of the crop; 4) All the points corresponding to the +/−10 cm neighborhood of the crop center are removed from the sorted list; and 5) The next point off the top of the array is picked, assuming that is the center of a new row, and the algorithm returns to Step 3. Iteration is performed until the magnitude of the peak is below a threshold (set relative to the mean of the scan line vector).

From this information, the absolute offset is calculated by selecting the crop rows that are immediately to the left and right of center, and using their locations to determine the offset. The spacing between the two rows is utilized to determine overall crop spacing. Absolute position measurements are more robust in most situations as a result, although in harsh lighting conditions, the locations of the crops cannot accurately be found, and therefore the absolute position estimate is not reliable. In this case, peak intensity and spacing of the crop row is determined. A nominal spacing of 30" is assumed. If the spacing is below 20" or above 40", it is assumed that the position estimate is not reliable. Therefore, the original method of relative positioning is defaulted to.

In addition to the above, it is necessary to make sure that the absolute position and relative position are synchronized. To ensure this, whenever satisfactory absolute positioning is achieved, the absolute offset which is calculated to update the template used for relative positioning is utilized. The update is performed taking the absolute offset into account so that if the absolute positioning disappears, the relative positioning will instantaneously generate the same output. An analogy for this behavior is using an Inertial Navigation System (INS) (i.e., relative positioning) to augment a Global Positioning System (GPS). GPS (absolute offset) is an optimal solution when it is available, and when it is available, it is used to keep the INS information updated. When GPS is not available, the INS information is used to maintain smoothness and state. It should be noted that the relative position, like INS, has the possibility of drifting over time. However any drift occurs slowly enough that extended periods of not having absolute positioning will not cause significant problems.

Figure 5A:
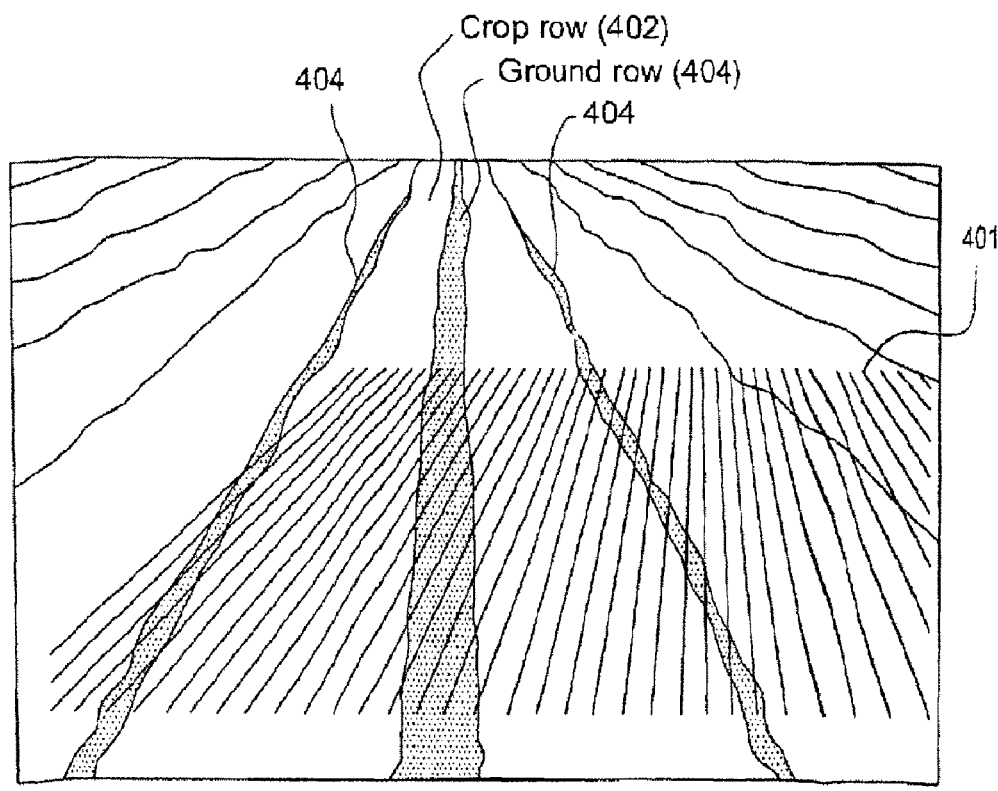
FIG. 5A is an illustration of a second alignment of scan line segments to crop rows.
Figure 5B:
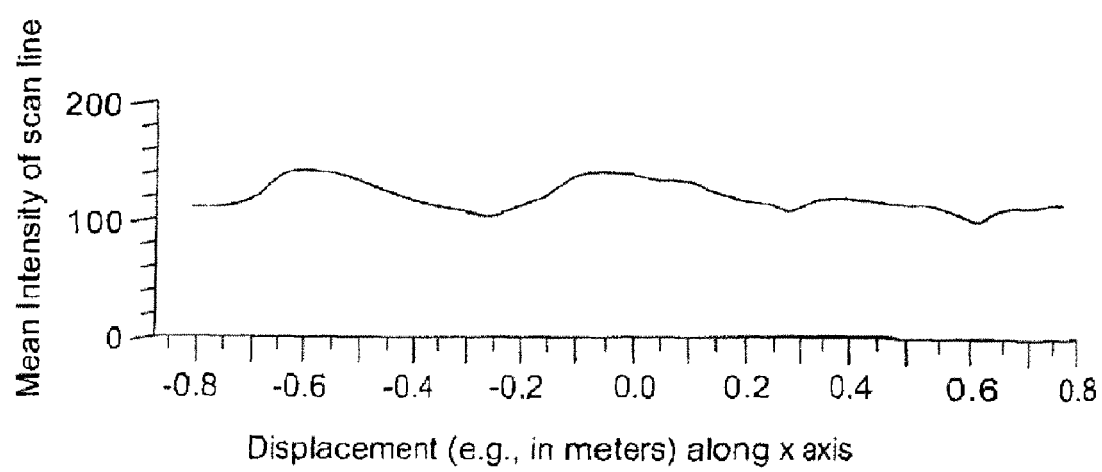
FIG. 5B is a second scan line profile associated with the second alignment of scan line segments to crop rows in FIG. 5A.

FIG. 5A shows a second alignment of scan line segments 401 to crop rows 402. The image data of FIG. 5A represents input data to the vision data processor 12, and the scan line profile of FIG. 5B represents illustrative data associated with the analyzer 24 or the confidence module 26. For example, the confidence module 26 evaluates the second alignment of scan line segments 401 to crop rows 402 (of FIG. 5A) as having a confidence score (discussed below) that fails to reach a minimum threshold confidence score.

In FIG. 5B, the second scan line profile is associated with a second alignment of scan line segments 401 to crop rows 402 in FIG. 5A. The second scan line profile appears on a chart in which the vertical axis represents mean scan line intensity (of pixels within the crop rows), and the horizontal axis represents relative distance along the X-axis (FIG. 5B). The peak intensity of the second scan line profile generally corresponds to a center of a crop row 402, whereas the minimum intensity generally corresponds to a ground row 404 between the crop rows 402. In another scenario, the confidence module 26 considers the variation in intensity between a center of a crop row 402 and a ground row 404 to determine the confidence score or reliability indicator.

The crop row center information also allows for the simplification of some calibration requirements. Conventionally, a user can manually position "crops" with known spacing, and adjust parameters in a parameter file until the appropriate scaling is found. The various embodiments of the present invention provide a display that includes an estimate of crop row spacing. If the spacing is known a-priori, as it usually is, this information can be used to guide the proper selection of the Fx calibration parameter, where the Fx parameter controls the scaling. In order to accomplish this, a conventional calibration procedure is followed, except that a function to enable processing absolute crop row locations is selected. If a vehicle is roughly aligned with good crop features in the field, the distance between the rows will be calculated. This distance is directly related to the Fx parameter. Changing the Fx parameter while computing absolute position will allow the user to view the effect of a changing Fx on the crop spacing. Therefore, all the user has to do is select an Fx parameter such that the reported crop row spacing is what is known a-priori. Adjusting the Fx parameter can be accomplished in a conventional fashion, i.e., by comparing the vergence point of the displayed indicator lines with the crops. This can also be done in the field. Therefore, artificial fiducials are no longer required, and calibration can be easily performed in the field.

In addition, added functionality to allow external devices to trigger a "recentering" in relative mode by sending the character "c" over the same serial port which is used for outputting binary data is included in the various embodiments of the present invention. Such a feature is enabled if absolute positioning is turned off. For the input to be active, a "Send RS-232 Data" feature must be enabled.

FIG. 5A and FIG. 5B represent a crop-row scene, but with a poor or unsatisfactory heading/yaw hypothesis. Accordingly, the heading/yaw hypothesis of FIG. 5A and FIG. 5B is not sufficiently reliable to qualify the candidate heading as a preferential heading. The mean intensity vector of FIG. 5B is generally, considerably smoother or flatter than that shown in FIG. 4B because hypothesized heading/pitch of FIG. 5B causes the scan line segments 401 to cross multiple crop-rows 402 (or multiple boundaries between crop rows 402 and ground rows 404), resulting in a smoother mean intensity vector. In one embodiment of the present invention, the confidence score may comprise the SAD of neighboring points in the mean intensity vector. Therefore, a vector with a good amount of variation, such as the one shown in FIG. 4B, will have a higher SAD score than a vector with little variation, such as that shown in FIG. 5B.

Figure 6A:
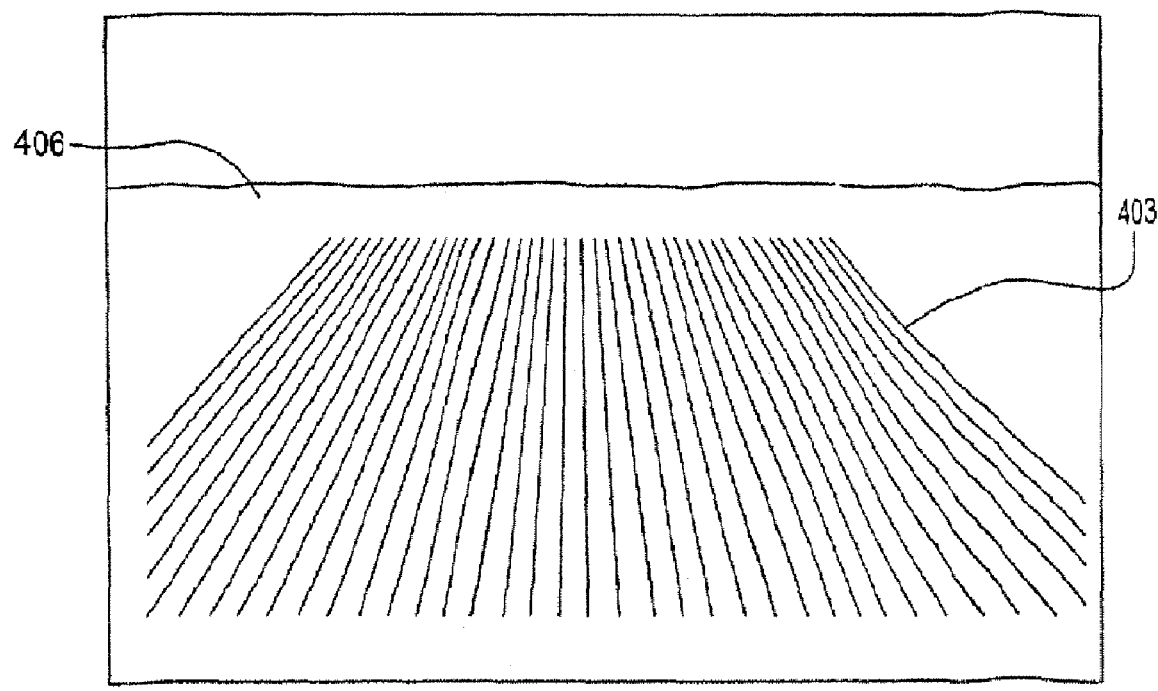
FIG. 6A is an illustration of a third alignment of scan line segments to crop rows.

In FIG. 6A a third alignment of scan line segments 403 to a crop 406 (without defined rows) indicates that no crop rows 402 are present. For example, the confidence module 26 evaluates the third alignment of scan line segments 403 to a crop 406 to have a confidence score below a minimum threshold confidence score that indicates the presence of crop rows 402.

Figure 6B:
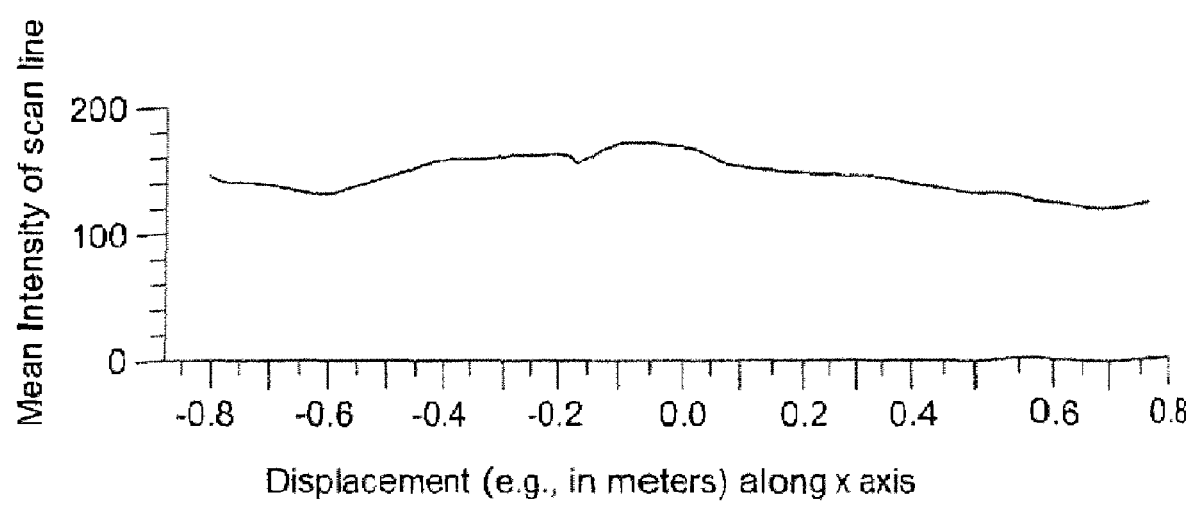
FIG. 6B is a third scan line profile associated with the third alignment of scan line segments to the crop rows in FIG. 6A.

FIGS. 6A and 6B collectively illustrate the performance of the confidence metric utilized in the confidence module 26 when no crop rows 402 are present in the image data. For example, no crop rows 402 may be present at the end of a crop row or edge of a field, or in a harvested field. Furthermore, some crops such as wheat or oats may not be planted in rows. Because there are no crop row features, edges or boundaries between the crop rows 402 and ground rows 404 to detect, there is no good hypothesis to determine any preferential heading and/or pitch.

In FIG. 6B, a third scan line profile is associated with a third alignment of scan line segments 403 to a crop 406 in FIG. 6A. The third scan line profile appears on a chart in which the vertical axis represents mean scan line intensity (of pixels within a scan line) and the horizontal axis represents relative distance along the X-axis. The peak intensity of the third scan line profile is not a reliable indicator of a center of a crop row. Similarly, the minimum intensity of the third scan line profile is not a generally reliable indicator of a ground row or intervening row. In one example, the vision data processor 12 or the confidence module 26 determines a confidence score or reliability indicator.

In general, the vision data processor 12, the search engine 22, or both may use a respective confidence score, derived from a corresponding scan line profile of FIG. 4B, FIG. 5B, or FIG. 6B. The confidence score is a confidence level, a reliability level or a measure to identify a preferential profile or to estimate a reliability of a preferential profile. The scan line profiles of FIG. 4B, FIG. 5B, and FIG. 6B may be associated with various pitch/yaw hypotheses (or candidate headings). If the scan line profile is associated with a confidence score or reliability level exceeding a minimum threshold level, the candidate heading (and yaw/pitch) associated with the corresponding scan line profile is identified as a preferential heading for the vehicle. Further, the vision data processor 12, the search engine 22 or both may use the confidence score as an absolute metric to determine whether the vision guidance system 11 or its tracking functionality is operating properly. In addition, the confidence score can be scaled to produce the most meaningful results relating to the determination of when the various embodiments of the present invention are able to ascertain position in the crop rows 402. This is most relevant in areas where saturation of the brightest portions of the image data occurs (usually, the crops), as for example, in areas receiving an abundance of sunlight.

Figure 7A:
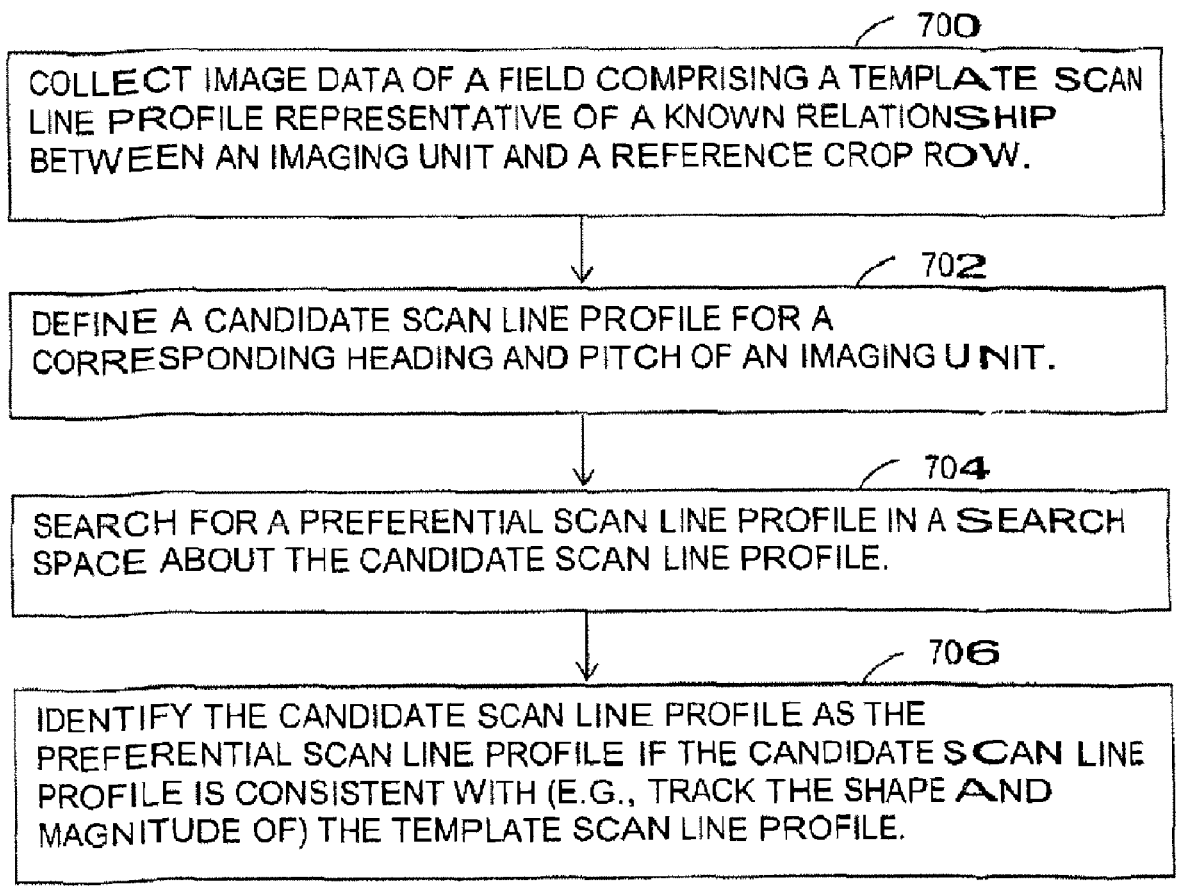
FIG. 7A is a flow chart of yet another embodiment of a method for identifying a position of a crop row in a field.

FIG. 7A describes another method of identifying crop rows 402 in a field. The method of FIG. 7A begins at 700 where an imaging unit 10 collects image data of a field comprising a template scan line profile representative of a known relationship between the imaging unit 10 and a reference crop row. For example, an operator may position a vehicle in a known or reference relationship to crop rows 402 to obtain the template scan line profile. The template scan line profile may be associated with a desired minimum degree of variation between a minimum mean scan line intensity and a maximum mean scan line intensity. The process described at 700 may be carried out in accordance with various procedures that may be applied separately or cumulatively. Using a first technique, an analyzer 24 or an updater updates the template scan line profile on a regular basis. Under a second technique, the analyzer 24 or a definer 20 detects a change in crop type or crop density to trigger an update of the template scan line profile. With a third technique, the analyzer 24 or the updater updates the template scan line profile to comprise a weighted function of the template scan profile and a new mean intensity vector.

At 702, the analyzer 24 or the definer 20 defines a candidate scan line profile for a corresponding heading (i.e., yaw) and pitch of the imaging unit 10. The candidate scan line profile comprises an array of vector quantities, where each vector quantity comprises an intensity value and a corresponding one-dimensional position data (e.g., along the X-axis 202).

At 704, the analyzer 24 or the search engine 22 searches candidate scan line profiles for a preferential scan line profile in a search space. The search space is defined by the corresponding pitch and heading of the imaging unit 10 or a range of pitches and headings of the imaging unit 10.

At 706, the analyzer 24 or a confidence module 26 identifies the candidate scan line profile as a preferential scan line profile if the candidate scan line profile is consistent with the template scan line profile. In one embodiment, the candidate scan line profile may be generally consistent with the template scan line profile except for a generally constant offset in position. The template scan line profile may be associated with a desired minimum degree of variation between a minimum mean scan line intensity and a maximum mean scan line intensity as described above. The candidate scan line profile may be considered generally consistent with the template scan line profile, if the desired minimum degree of variation is commensurate for the candidate scan line profile and the template scan line profile. Being commensurate indicates that the desired minimum degree of variation is generally equal to or the variation of the candidate scan line profile is generally greater than the variation of the template scan line profile. The mere identification of the preferential scan line profile does not necessarily, without more analysis, identify the position of the crop rows 402. Rather, the vision data processor 12 may interpret the preferential scan line profile to estimate a position or center of one or more crop rows 402.

Figure 7B:
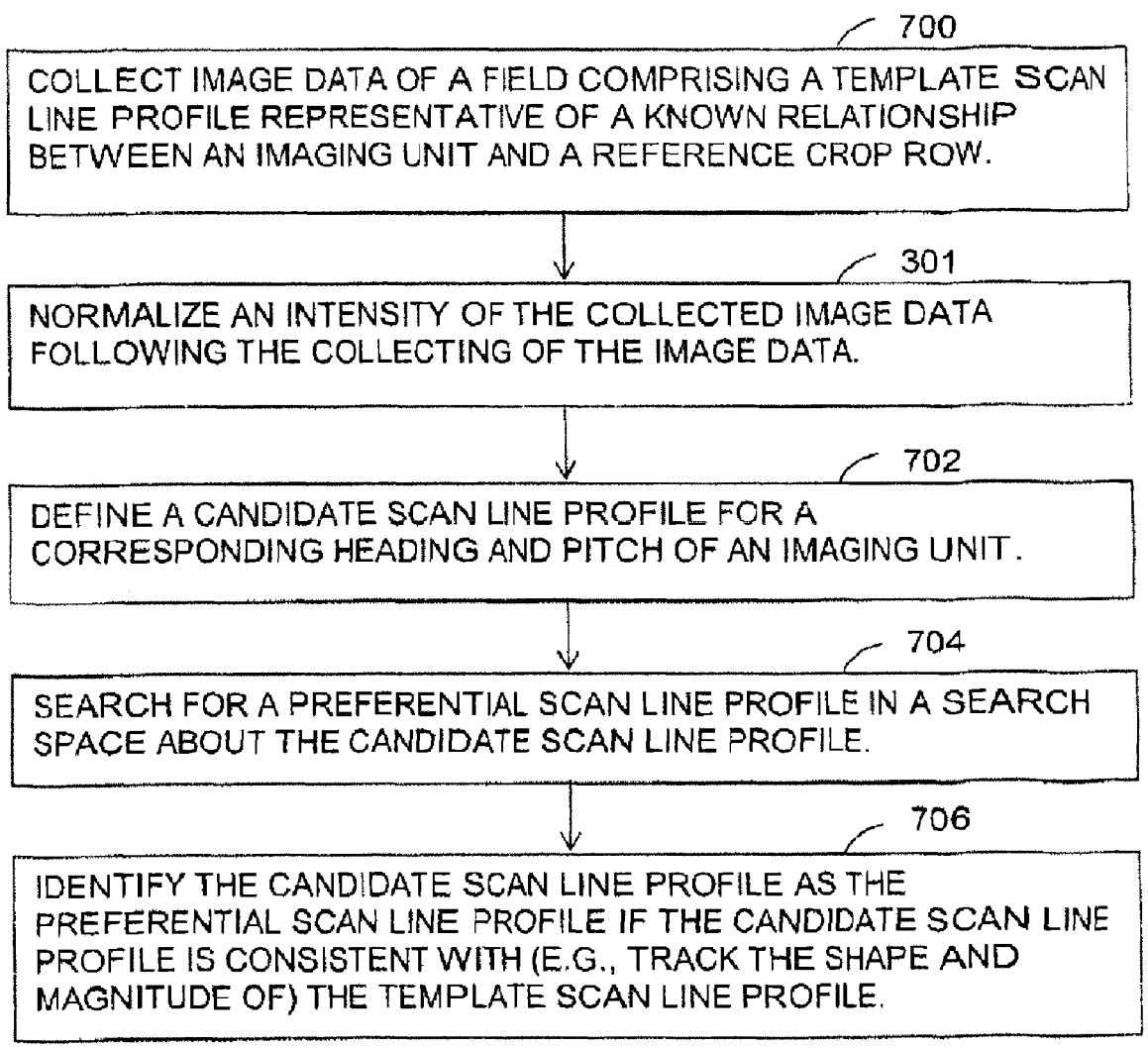
FIG. 7B is a flow chart of still another embodiment of a method for identifying a position of a crop row in a field.

FIG. 7B is similar to FIG. 7A, except FIG. 7B further comprises an additional process at 301 after the process described at 700. Like reference numbers in FIG. 7A and FIG. 7B indicate like processes.

At 301, the pre-processor 18 normalizes an intensity of the collected image data following the collecting of the image data. For example, the pre-processor 18 defines a virtual, generally horizontal plane in the collected image data; and subtracts out the virtual, generally horizontal plane to reduce the image intensity variation throughout the image as described above.

Figure 8:
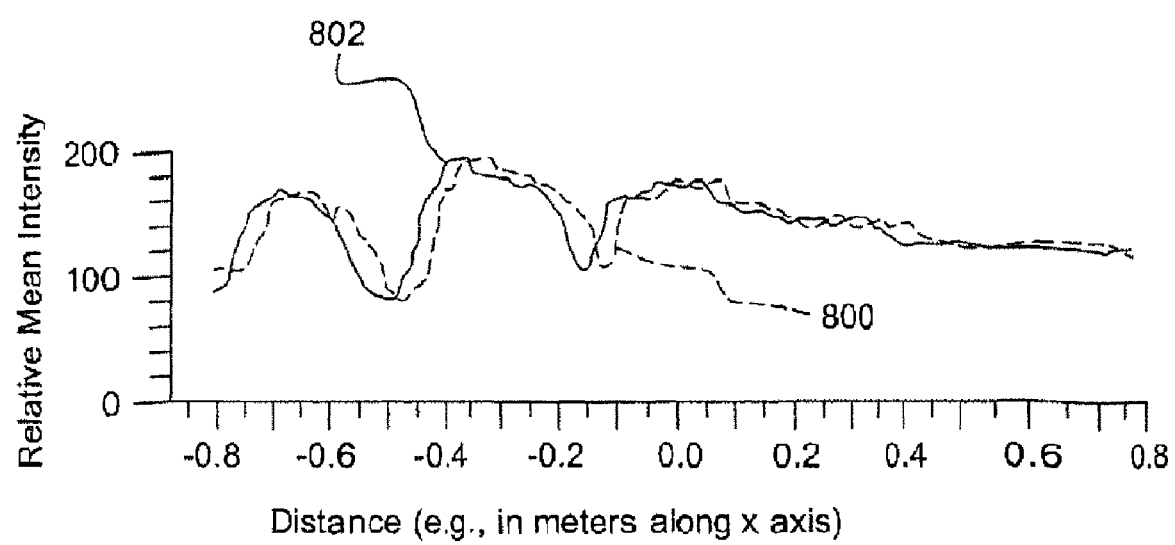
FIG. 8 is a diagram comparing a template scan line profile to a candidate scan line profile.

FIG. 8 is a composite scan line profile chart that includes a template scan line profile and a measured candidate scan line profile. The vertical axis shows the relative mean-intensity of scan line segments, where the horizontal axis shows relative displacement (e.g., in meters along the X-axis 202). The template scan line profile 800 is shown as a dashed line, whereas the measured candidate scan line profile 802 is shown as a solid line. As shown in FIG. 8, there is a generally constant, horizontal offset in position, along the horizontal axis between the template scan line profile 800 and the measured candidate scan line profile 802. The offset may be representative of a correction in the path of the vehicle to achieve a desired degree of accuracy in tracking one or more crop rows. Furthermore, the template scan line profile 800 has approximately the same degree of variation in mean intensity as the candidate scan line profiles 802.

At the beginning of a run or within the process described at 700, a vehicle operator may press a button or otherwise activate the vision data processor 12 to store the template scan line profile 800 when the vehicle (e.g., tractor) is centered and pointing approximately down the crop row 402. The lateral position of the tractor at that time will be considered the target path or the "center of the lane." The template scan line profile 800 includes a series of mean intensity vectors that are associated with a target heading/pitch or target yaw/pitch angles which are computed, the hypotheses of which are used as the templates that comprise the series of mean intensity vectors. Assuming that the heading (yaw) and pitch do not change greatly from frame to frame (i.e., that the vehicle observes some basic dynamic constraints), any change in the mean intensity vector from frame to frame of the images will generally be the result of a change in lateral offset as shown in FIG. 8.

The template scan line profile 800 shows the mean intensity vectors at time t, when the vehicle operator pressed the button or activated the vision data processor 12 indicating that the current lateral position is to be considered the center of the lane. The measured candidate scan line profile 802 shows the intensity vectors at a subsequent time, e.g., t+1, although it should be noted that the subsequent time can be at any appropriate time, such as at a time t+2 or t+3. The offset between the profiles (or any two mean intensity vectors within the profiles) is caused by the lateral motion of the vehicle. To compute the lateral offset, a cross-correlation measure between both intensity vectors may be determined.

Because the vehicle may be running over different crop rows 402 and different crops 406, a single template mean intensity vector may not be sufficient to operate in all conditions. Therefore the template profile can be reset or changed over time, adapting to current or desired conditions. This flexibility adds robustness to natural intensity changes, along with changes in crop type and crop density. In one embodiment of the present invention, the adaptation of the template scan line profile 800 occurs on a regular basis (e.g., at a fixed interval), as adapting at every frame can lead to an accumulation of small errors and a subsequent drift in the lateral position estimate. In another embodiment of the present invention, the update of the template scan line profile 800 may comprise a weighted function of the current template scan line profile 800 and a new scan line profile (e.g., one or more new mean intensity vectors), rather than a complete replacement to achieve robust and smooth transitions.

Figure 9A:
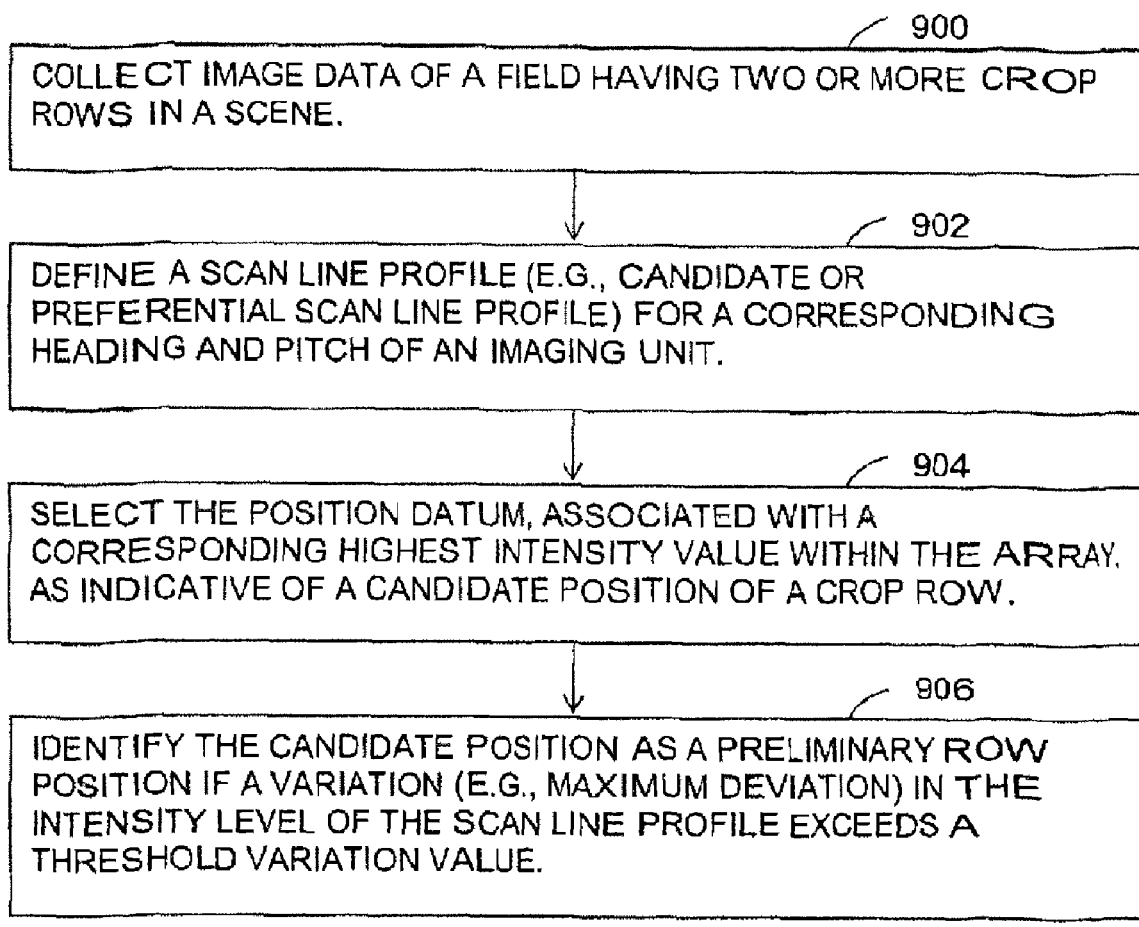
FIG. 9A is a flow chart of an additional embodiment of a method for identifying a position of a crop row in a field.

The method described in the flow chart shown in FIG. 9A relates to yet another method of identifying a position of a crop row 402 in a field. The method of FIG. 9A begins at 900, where an imaging unit 10 collects image data of a field having two or more crop rows in a scene.

At 902, an analyzer 24 or a definer 20 defines a scan line profile (e.g., a candidate or preferential scan line profile) for a corresponding heading and pitch of the imaging unit 10. The candidate scan line profile comprises an array of vector quantities, where each vector quantity comprises an intensity value and a corresponding position datum. The process described at 602 may be carried out in accordance with various techniques, which may be applied individually or cumulatively. Under a first technique, the analyzer 24 or the definer 20 defines the candidate scan line profile 802 as a preferential scan line profile if the variation in the intensity level exceeds a threshold variation value. Under a second technique, the analyzer 24 or the definer 20 defines the candidate scan line profile as a preferential scan line profile if a variation in the intensity level between a minimum intensity level and a maximum intensity level exceeds a threshold variation value. Under a third technique, the analyzer 24 or the definer 20 determines a SAD (of pixel intensities) for the candidate scan line profile; where the candidate scan line profile is regarded as a preferential scan line profile if the SAD exceeds a threshold variation value.

At 904, the analyzer 24 or a search engine 22 selects the position datum, associated with a corresponding highest intensity value within the array (of the scan line profile), as indicative of a candidate position of a crop row. For example, the analyzer 24 or the search engine 22 sorts the vector quantities in ascending or descending order within the array based on the intensity value to select the position datum associated with the corresponding highest intensity value. The intensity value may comprise a mean intensity value associated with a scan line segment within the collected image data.

At 906, the analyzer 24 or a confidence module 26 identifies the candidate position as a preliminary row position if a variation in the intensity level of the scan line profile exceeds a threshold variation value. The process described at 906 may be carried out in accordance with various procedures. Under a first procedure, the analyzer 24 or the confidence module 26 selects the selected position datum as a preliminary row position if a variation in the intensity level of the scan line profile exceeds a threshold value. Under a second procedure, the analyzer 24 or the confidence module 26 determines a weighted centroid of the intensity level within a region about the selected position datum; and identifies a preliminary row position as a refined row position based on the weighted centroid.

The method of FIG. 9A may be supplemented by one or more additional processes. For example, the analyzer 24 may disregard the scan line vector quantities in the array within a defined neighborhood of at least one of the preliminary row position and a refined row position, wherein the defined neighborhood is commensurate with a predetermined row spacing between the crops.

Figure 9B:
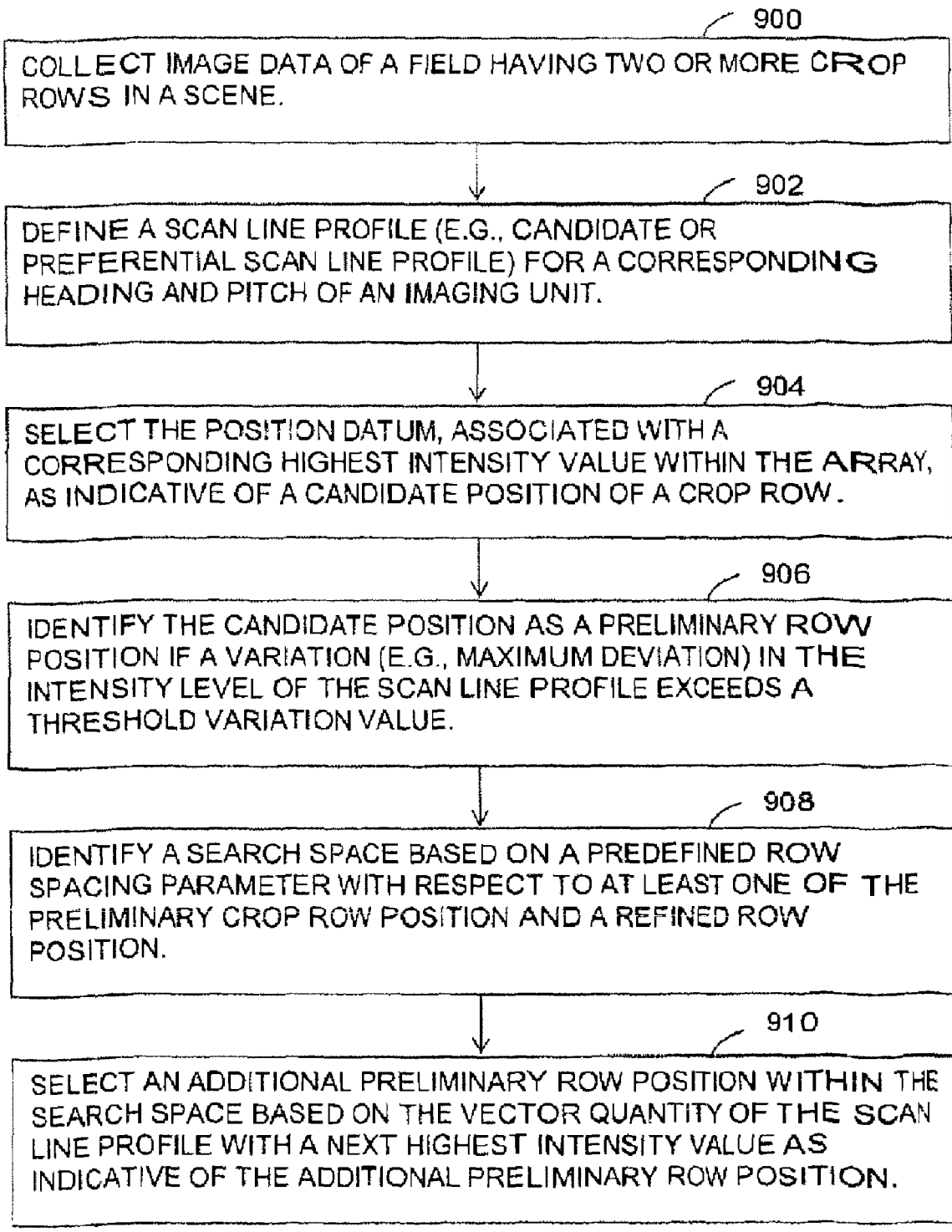
FIG. 9B is a flow chart of a further embodiment of a method for identifying a position of a crop row in a field.

The method of FIG. 9B is similar to the method of FIG. 9A, except that FIG. 9B includes additional processes 908 and 910. Step 908 may follow step 906, for example.

At 908, the analyzer 24 or the search engine 22 identifies a search space based on a predefined row spacing parameter with respect to at least one of the preliminary crop row position and a refined row position. For example, at 904, the search engine 22 identifies a maximum intensity in the array as a candidate position or preliminary crop row position of a first crop row. Once the first crop row is identified at 904, the search engine 22 identifies excluded scan line vectors within a predefined distance range (e.g., 10 cm) on either side of the candidate position of the first crop row and defines a desired search space based on the row spacing of the crops at 908. An operator may enter or select the row spacing of the crops into the data processor 12 via the user interface 28. The row spacing may be determined by particular seeding or planting equipment used to sow or plant the crop, for example. The excluded scan line vectors are excluded from further evaluation to conserve processing resources of the vision data processor 12 and provide a more rapid solution within the search space.

At 910, the analyzer 24 or the search engine 22 selects an additional preliminary row position within the search space based on the vector quantity of the scan line profile with a next highest intensity value as indicative the additional preliminary row position. In preparation for identifying the next highest intensity value, the analyzer 24 or the search engine 22 may sort the array based on the intensity value. In one example of carrying out the process at 610, the analyzer 24 or the search engine 22 selects an additional preliminary row position until a magnitude of the mean scan line intensity is less than a threshold value.

At 910, the search engine 22 or the vision data processor 12 identifies the next scan line vector with the maximum intensity (after identifying the position datum associated with the highest intensity value at 904). The candidate position of the second crop row, which may or may not be adjacent to the first crop row, is identified within the desired search space. If the first and second crop rows are adjacent rows, the row width may be estimated by directly subtracting the difference between the position datum (determined at 904) and the additional preliminary row position (determined at 910). The additional preliminary row position and the position datum may each be expressed as a displacement or relative displacement along the X-axis. The row width (e.g., along the X-axis) may be estimated and compared to a planting row width to determine the confidence or reliability of the position or center of the crop row estimate.

Figure 10A:
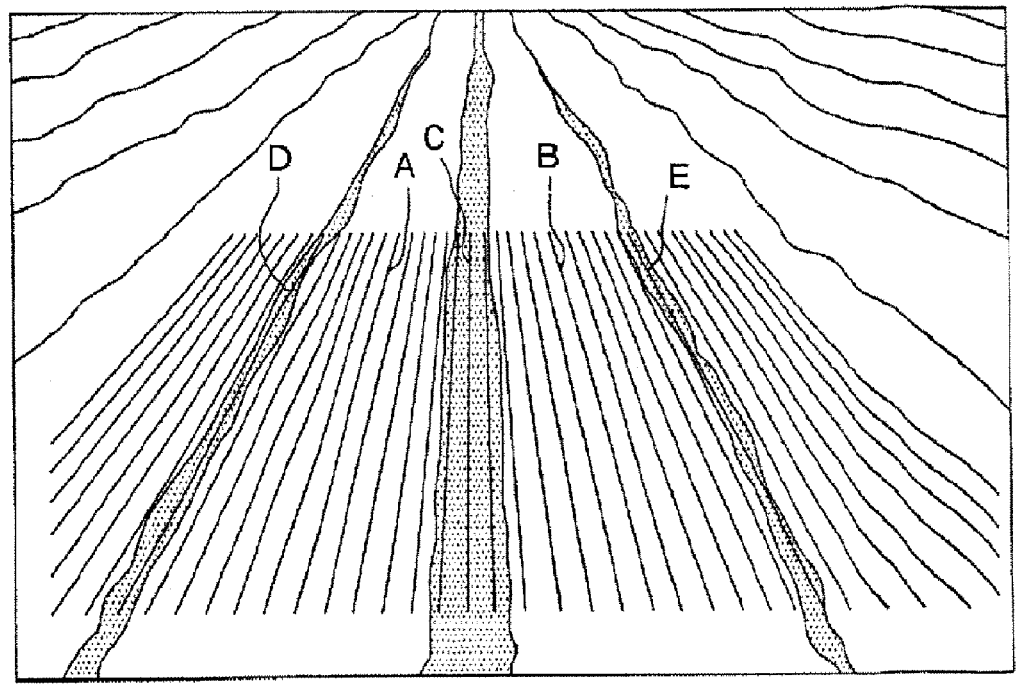
FIG. 10A is an illustration of an alignment of scan line segments to crop rows.
Figure 10B:
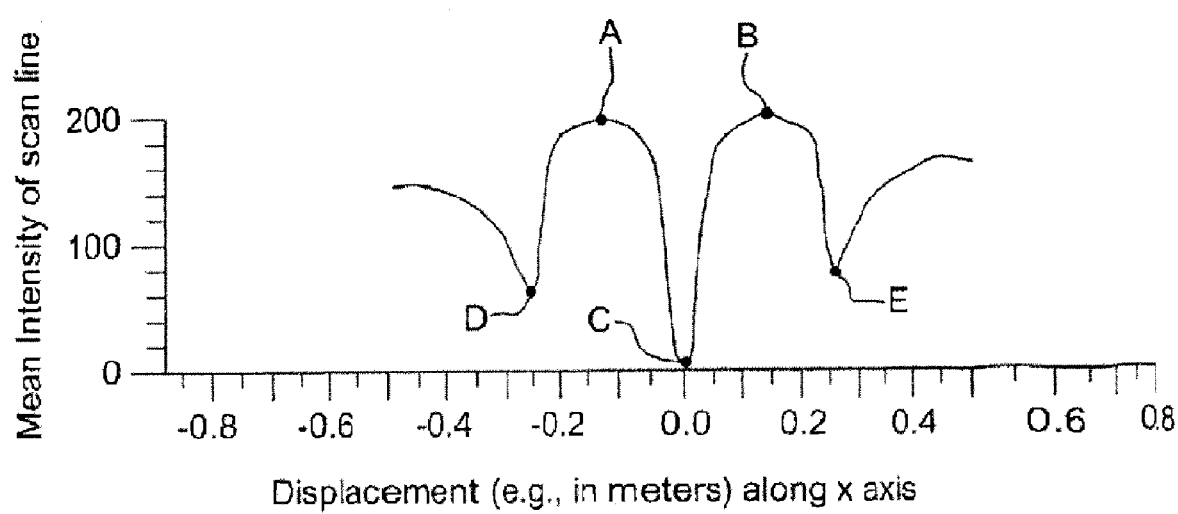
FIG. 10 B is a scan line profile associated with the alignment of scan line segments in FIG. 10A.

FIG. 10A illustrates an image collected pursuant to step 900, for example. Scan line segments or linear projections are superimposed over the collected image. As shown, the scan line segments are generally aligned with the crop rows. Some of the scan line segments overlap or overlie the crop rows. The scan line segments associated with points A and B overlie the crop rows, whereas the scan line segments associated with points C, D and E overlie ground rows or intervening rows, between the crop rows. FIG. 10 A represents inputted image data for FIG. 10B.

FIG. 10B shows a scan line profile corresponding to the collected image of FIG. 10A. Like reference points A, B, C, D and E indicate like elements in FIG. 10A and FIG. 10B. The vertical axis of FIG. 10B represents mean intensity of a corresponding scan line of FIG. 10A, while the horizontal axis represents the displacement along the X-axis 202. As illustrated, a center of each crop row corresponds to a peak or highest mean intensity level of the scan line profile at reference points A or B, whereas a ground row (or intervening row) corresponds to a valley or lowest mean intensity level of the scan line profile at reference point C, D, or E.

A communication protocol that can be used to send the various data discussed above to a controller, such as the steering controller 30 and/or the vehicle steering system 32, is described below. The communication protocol comprises a serial binary protocol. Table 1 shows the breakdown of bits needed to encapsulate the various data output from the vision data processor 12.

TABLE 1

| Parameter | Min Value | Max Value | Increment | Integer Range | Units | Bits |
|---|---|---|---|---|---|---|
| Frame Counter | 0 | 65535 | 1 | (0, 65535) | Frames | 16 |
| Vehicle Yaw | −10.0 | 10.0 | 0.1 | (0, 200) | Deg | 8 |
| Vehicle Pitch | −10.0 | 10.0 | 0.1 | (0, 200) | Deg | 8 |
| Vehicle Offset | −2.5 | 2.5 | 0.02 | (0, 250) | Meters | 8 |
| Vehicle Curvature | −16 | 15.25 | 0.125 | (0, 250) | Deg/Meter | 8 |
| System Confidence | 0 | 255 | 1 | (0, 255) | N/A | 8 |
| Total Bits | | | | | | 56 |

Table 2 shows an exemplary raw data packing format.

TABLE 2

| Byte | B8 | B7 | B6 | B5 | B4 | B3 | B2 | B1 |
|---|---|---|---|---|---|---|---|---|
| Byte 1 | | | | Frame Counter Low Byte | | | | |
| Byte 2 | | | | Frame Counter High Byte | | | | |
| Byte 3 | | | | Vehicle Yaw | | | | |
| Byte 4 | | | | Vehicle Pitch | | | | |
| Byte 5 | | | | Vehicle Offset | | | | |
| Byte 6 | | | | Vehicle Curvature | | | | |
| Byte 7 | | | | System Confidence | | | | |
| Byte 8 | | | | Unused | | | | |

Because the above data is initially sent over an RS-232 link, as between the control port 16 and the steering controller 30 and/or the vehicle steering system 32, synchronization is needed so that the receiving entity can determine when a new packet begins. Therefore, each packet can start with the following four bytes: 0x00 0xFF 0x00 0xFF, followed by the raw data in binary format. Therefore, each complete RS-232 packet will be 12 bytes long. A checksum can be added at the end of each packet, where the checksum is generated by adding all the data bytes (not including sync bytes) and "modding" the result by 256.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps It can be appreciated that numerous other possible applications of the present invention are possible and the applications mentioned herein are merely for sample purposes and not meant in any way to limit the spirit and scope of the invention as claimed in the appended claims.

While the particular systems and methods herein shown and described in detail are fully capable of attaining the above-described objects of the invention, it is understood that the description and drawings presented herein represent some, but not all, embodiments of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A method of identifying a position of a crop row in a field comprising:
    collecting, via an imaging unit, image data of two or more crop rows;
    defining a candidate scan line profile for a corresponding heading and pitch of directional movement associated with the imaging unit and relative to the two or more crop rows, the candidate scan line profile comprising an array of vector quantities, each vector quantity comprising an intensity value and a corresponding position datum;
selecting the position datum associated with a corresponding highest intensity value within the array, as indicative of a candidate position of a crop row; and
identifying the candidate position as a preliminary row position if a variation in intensity level of the candidate scan line profile exceeds a threshold variation value.

2. The method of claim 1, wherein the defining includes defining the candidate scan line profile as a preferential scan line profile if the variation in intensity level exceeds a threshold variation value.

3. The method of claim 1, wherein the defining includes defining the candidate scan line profile as a preferential scan line profile if a variation in intensity level between a minimum intensity level and a maximum intensity level exceeds a threshold variation value.

4. The method of claim 1, wherein the defining includes:
determining a sum of absolute differences for the candidate scan line profile; and
defining the candidate scan line profile as a preferential scan line project if the sum of the absolute differences exceeds a threshold variation value.

5. The method of claim 1, wherein the selecting comprises sorting vector quantities in one of an ascending order and a descending order within the array based on the intensity value.

6. The method of claim 1, wherein the intensity value comprises a mean intensity value associated with a scan line segment within the collected image data.

7. The method of claim 1, wherein the selecting of the position datum comprises selecting the selected position datum as a preliminary row position if a variation in the intensity level of the candidate scan line profile exceeds a threshold value.

8. The method of claim 1, further comprising:
determining a weighted centroid of the intensity value within a region about the selected position datum; and
identifying a preliminary row position as a refined row position based on the weighted centroid.

9. The method of claim 1, further comprising disregarding vector quantities in the array within a defined neighborhood of at least one of the preliminary row position and a refined row position, wherein the defined neighborhood is commensurate with a predetermined row spacing between the two or more crops.

10. The method of claim 1, further comprising identifying an additional preliminary crop row position with a desired search space based on a predefined row spacing parameter with respect to at least one of the preliminary row position and a refined row position.

11. The method of claim 10, further comprising selecting an additional preliminary row position within the desired search space based on a vector quantity of the candidate scan line profile with a next highest intensity value as indicative of the additional preliminary row position.

12. The method of claim 1 further comprising, selecting an additional preliminary row position until a magnitude of a mean scan line intensity is less than a threshold value.

13. An apparatus for identifying a position of a crop row in a field comprising:
a processor; and
a memory unit communicatively connected to the processor and including:
computer code for collecting, via an imaging unit, image data of two or more crop rows;
computer code for defining a candidate scan line profile for a corresponding heading and pitch of directional movement associated with the imaging unit and relative to the two or more crop rows, the candidate scan line profile comprising an array of vector quantities, each vector quantity comprising an intensity value and a corresponding position datum;
computer code for selecting the position datum associated with a corresponding highest intensity value within the array, as indicative of a candidate position of a crop row; and
computer code for identifying the candidate position as a preliminary row position if a variation in the intensity level of the candidate scan line profile exceeds a threshold variation value.

14. The apparatus of claim 13, wherein the memory unit further comprises computer code for, defining the candidate scan line profile as a preferential scan line profile if the variation in the intensity level exceeds a threshold variation value.

15. The apparatus of claim 13, wherein the memory unit further comprises computer code for, defining the candidate scan line profile as a preferential scan line profile if a variation in the intensity level between a minimum intensity level and a maximum intensity level exceeds a threshold variation value.

16. The apparatus of claim 13, wherein the memory unit further comprises computer code for:
determining a sum of absolute differences for the candidate scan line profile; and
defining the candidate scan line profile as a preferential scan line profile if the sum of the absolute differences exceeds a threshold variation value.

17. The apparatus of claim 13, wherein the memory unit further comprises computer code for, sorting vector quantities within the array in one of either an ascending and descending order, based on the intensity value in order to select the position datum.

18. The apparatus of claim 13, wherein the intensity value comprises a mean intensity value associated with a scan line segment within the collected image data.

19. The apparatus of claim 13, wherein the memory unit further comprises computer code for, selecting the position datum as a preliminary row position if a variation in the intensity level of the candidate scan line profile exceeds a threshold value.

20. The apparatus of claim 13, wherein the memory unit further comprises computer code for:
determining a weighted centroid of the intensity level within a region about the selected position datum; and
identifying a preliminary row position as a refined row position based on the weighted centroid.

21. The apparatus of claim 13, wherein the memory unit further comprises computer code for:
disregarding vector quantities in the array within a defined neighborhood of at least one of the preliminary row position and a refined row position, wherein the defined neighborhood is commensurate with a predetermined row spacing between the two or more crops.

22. The apparatus of claim 13, wherein the memory unit further comprises computer code for, identifying an additional preliminary crop row position with a desired search space based on a predefined row spacing parameter with respect to at least one of the preliminary row position and a refined row position.

23. The apparatus of claim 22, wherein the memory unit further comprises computer code for, selecting an additional preliminary row position within the desired search space based on the vector quantity of the candidate scan line profile with a next highest intensity value as indicative of the additional preliminary row position.

24. The apparatus of claim 13, wherein the memory unit further comprises computer code for, selecting an additional preliminary row position until a magnitude of a mean scan line intensity is less than a threshold value.

25. A computer program product, embodied on a computer-readable medium, for identifying a position of a crop row in a field comprising:
   computer code for collecting, via an imaging unit, image data of two or more crop rows;
   computer code for defining a candidate scan line profile for a corresponding heading and pitch of directional movement associated with the imaging unit and relative to the two or more crop rows, the candidate scan line profile comprising an array of vector quantities, each vector quantity comprising an intensity value and a corresponding position datum;
   computer code for selecting the position datum, associated with a corresponding highest intensity value within the array, as indicative of a candidate position of a crop row; and
   computer code for identifying the candidate position as a preliminary row position if a variation in intensity level of the candidate scan line profile exceeds a threshold variation value.

26. A system for identifying a position of a crop row in a field, the system comprising:
   an imaging unit for collecting image data of two or more crop rows;
   an imaging unit interface for receiving the collected image data;
   a definer communicatively connected to the imaging unit interface configured to define a candidate scan line profile for a corresponding heading and pitch of the imaging unit, the candidate scan line profile comprising an array of vector quantities, each vector quantity comprising an intensity value and a corresponding position datum;
   a selector configured to select a position datum associated with a corresponding highest intensity value within the array of vector quantities, as indicative of a candidate position of a crop row;
   a confidence module configured to identify the candidate position as a preliminary row position if a variation in the intensity level of the candidate scan line profile exceeds a threshold variation value; and
   a control port configured to output directional movement instructions to a vehicle steering controller, the directional movement instructions derived from the preferential scan line profile.

* * * * *